Figure 1:
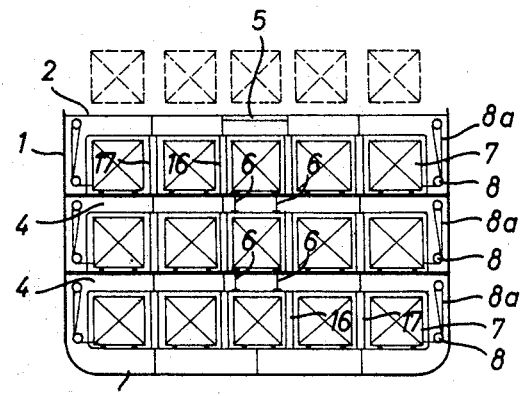

April 23, 1963   G. W. LEHMANN   3,086,489
CONTAINER AND AUTOMOBILE CARRIER
Filed April 16, 1959

INVENTOR:
GUENTHER W. LEHMANN
By
Erich M. H. Radde
AGENT

United States Patent Office 3,086,489
Patented Apr. 23, 1963

3,086,489
CONTAINER AND AUTOMOBILE CARRIER
Guenther W. Lehmann, Honolulu, Hawaii
(620 Americana Drive, Annapolis, Md.)
Filed Apr. 16, 1959, Ser. No. 806,847
4 Claims. (Cl. 114—72)

The present invention relates to water transportation of cargo and, more particularly, to improved means for carrying containers or cargo-supporting frames on ships.

It is understood that the invention is applicable to shipping rigid cargo-carrying containers as well as rigid cargo-carrying frames and such containers or frames will be called "cargo-supporting bodies" hereinafter in the specification and in the claims annexed hereto.

Transportation of cargo packed in large containers has been used in sea and river shipping with rising success. For instance, rectangular and like containers have been equipped with aft wheels to be attached with their forward end to the platform of a truck for transportation overland to the pier. At the pier, the container is detached from the truck and loaded onto a boat for transportation over water. Other types of cargo containers have no wheels of their own but are lifted aboard by the ship's boom gear or by a shoreside crane.

Containers with attached aft wheels are wasteful of cargo space because the space between the bottom of the container and the deck is taken up only by the wheels instead of serving to accommodate the payload. Consequently, the ratio of useful cargo weight to available cargo space is rather unfavorable.

Wheelless cargo boxes make considerably more economical use of the available cargo space. However, while such boxes make substantially full use of the available space, they present a considerable problem in regard to shifting the containers in the cargo hold, particularly in the case of large and heavy boxes. It has been proposed to overcome this difficulty by providing removable hatches and rolling wing decks on which a number of containers are placed to shift them in the wings of the cargo hold. This involves high installation costs for the shifting system. It entails the further disadvantage of causing considerable listing of the ship during loading and unloading, due to the shifting of a number of heavy containers at the same time.

It is the principal object of the present invention to overcome all of the above shortcomings in prior cargo water transportation systems and to provide very simple means for carrying cargo containers and cargo-supporting frames aboard ships.

It is another object of the present invention to provide ships with simple and readily removable support means for cargo containers and cargo-supporting frames, removal of the support means creating an empty cargo hold and, thus, converting the ship into a bulk carrier.

Other objects of the present invention and advantageous features thereof will become apparent as the description proceeds.

Bulk carriers constitute the simplest cargo ships. They simply consist of a floating or buoyant shell defining a hold carrying bulk cargo, such as liquids or particulate materials, including oil, cereals, coal, ore, gravel, and the like. Thus, the ship shell itself is the only support for the cargo.

The present invention is the result of a search of coming as closely as possible to the simplicity of bulk carriers and takes advantage of the strength of the cargo frame support container body itself for the support of the cargo in the ship. It has been found that a rigid container body filled with cargo or a rigid frame carrying the cargo will effectively support the weight of the cargo aboard ship if the container or the frame is supported only at two opposite points, i.e., fore and aft. The central portion of the frame or container requires no support and will be maintained against bending by the rigidity of the container or frame body itself. Therefore, no deck is required between the spaced supports engaging the frame or container at opposite points.

Accordingly, a ship with cargo space is provided and in this cargo space a girder system consisting of a plurality of lengthwise and transverse girders arranged at one or more levels is mounted. Rigid cargo-supporting bodies, such as containers or frames, are supported at or close to their respective opposite ends on adjacent ones of said girders and may be shifted on the girder supports by means of rollers.

The lengthwise and transverse girders are preferably perpendicular to each other, pairs of lengthwise and transverse girders forming tracks for the cargo-supporting bodies. Roller means mounted between the tracks and the frames or containers facilitate their shifting on the tracks.

It is understood, of course, that the frames or containers are dimensioned according to the girder spacing, the spacing of one group of girders being substantially the same as one of the dimensions of the frames or containers, while the spacing of the tracks perpendicular thereto, have the same width as the other dimension of the frames or containers.

In accordance with the present invention, the girder system may be removably mounted in the cargo space, in which case the ship will serve as a multi-purpose cargo vessel. When the girder system is in position, the ship will be adapted for carrying boxed cargo. When the girder system is removed, an unobstructed cargo space will remain to accommodate bulk cargo, such as shipments of grain, coal, ore, and the like.

Figure 2:
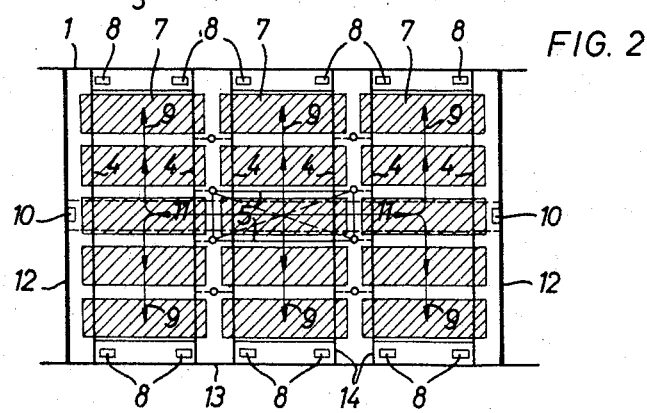
Figure 3:
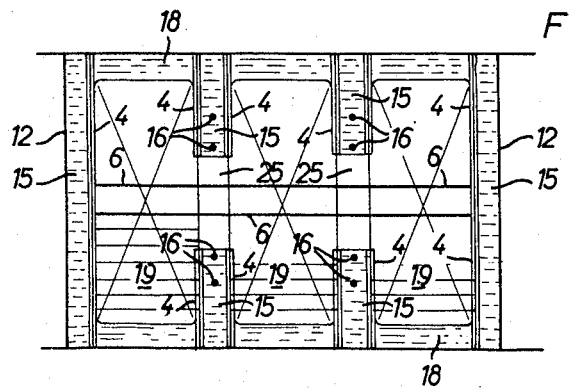

The above and other objects, advantages and features of the present invention will be more fully understood in connection with the following detailed description of certain preferred embodiments thereof, taken in conjunction with the accompanying drawing, wherein FIG. 1 is a vertical section, i.e., cross section of the cargo space of a ship;

FIG. 2 is a plan view of one level of the cargo space loaded with containers; and FIG. 3 is a view similar to that of FIG. 2 but without the cargo containers and with the longitudinal track girders as well as the center portions of the transverse track girders removed, as shown in broken lines, showing the cargo space adapted for bulk cargo.

Referring now to FIGS. 1 and 2, there is shown a ship hull 1 defining a cargo space between bottom 3 and upper deck 2. The vertical walls of the cargo space may, of course, be constituted by bulkheads 12 sub-dividing the interior of the ship. A plurality of transverse, horizontal girders 4 are mounted between vertical bulkheads 12 or ship hull 1 in the cargo space, pairs of the girders forming a support track for the containers 7. In the illustrated embodiment, two superposed levels of horizontal girders are shown, a third row of containers resting on the ship bottom.

The upper deck 2 has a longitudinally extending hatch 5 to permit containers 7 to be lowered into the cargo space by any suitable and conventional means (not shown), such as cranes. Running perpendicularly to the transverse girders 4 and aligned with the hatch 5, there is mounted between bulkheads 12 a longitudinally extending pair of girders 6 at each level of the transverse girders, the latter pair of girders serving to permit the lowered container to be moved to a desired transverse track on which it is then shifted into its final position. As will be seen by the arrows in FIG. 2, this criss-cross arrangement of support tracks makes ready movement of the containers on the girder supports possible.

Shifting of heavy cargo containers on tracks 4 in direction 9 is facilitated by mounting manually-operated or motor-driven pulleys 8 on hull 1, ropes 8a being operated by said pulleys and being attachable to containers 7 for pulling them in direction 9 (see FIG. 2). A similar pulley and rope system 10 is mounted on bulkheads 12 for pulling the containers in lengthwise direction 11 along track 6. As shown in FIG. 2, the pulleys 8 are mounted between webs 14 at shell 13.

As shown in FIG. 3, gangways 15 are arranged between adjacent girders 4 to enable men to walk between transverse tracks for lashing or unlashing the containers. Stringers 18 of the hull structure may also serve as longitudinal walkways.

The longitudinal track girders 6 and center portions 25 of transverse girders 4 are removable so that cargo may be lowered to the lower levels of the girder system.

If desired, planks or platforms 19 may be removably mounted between the girders but it will be appreciated that these deck areas are not designed to support the cargo load, the containers being supported solely by the girders and their buckling under the weight of the cargo being prevented by the rigidity of the container body. When it is desired to use the cargo space for bulk cargo, planks 19 are, of course, removed (if they are provided at all) and is is equally clear to the skilled in the art that the girders may be removably attached to the bulkheads so that they, too, may be dismounted to provide a totally unobstructed cargo space for bulk cargo.

Columns or pillars 16 may be arranged on port and starboard to reduce the unsupported length of the track girders 4 and thus make is possible to reduce the cross section of the girders without reducing their bearing capacity.

As pointed out previously, the girder system of the present invention is adapted for the support of cargo-carrying containers without wheels as well as for stowing containers having their own wheels and for automobiles. Advantageously, the latter are first placed on supporting frames, the latter being equipped with rollers for movement over the track girders of the cargo vessel.

A cargo ship built according to the present invention provides not only much simpler and less expensive means for supporting cargo-supporting bodies than prior art boats with movable hatches and rolling wing decks, but also assures greater ease and flexibility in shifting cargo units in the hold of the ship. At the same time, it makes as economical use of cargo space as any known carrier, containers with wheels and cars also being transportable on the girder system of the present invention.

An additional advantage of this cargo carrying system is its ready convertibility from a cargo container carrier to a bulk cargo carrier.

If desired, particularly in case where the ship is to serve only occasionally as a carrier for cargo containers, a single hatch may suffice for the entire ship or for each compartment. If it is preferred to do without cranes or booms, an elevator may be arranged in each hatch to lower each container into the hold. The hatch or hatches are preferably built as flush deck hatches to provide an unobstructed upper deck on which additional containers may be stowed.

As is clear from the above description, a ship built according to the present invention permits maximum exploitation of available cargo space. It permits the use of a bulk carrier for transporting cargo containers without changing the basic ship structure. Thus, a ship which is basically a bulk carrier may be used for carrying cargo in containers, including liquids, such as wine, fruit juices, lubricating oil, liquid chemicals, and deep frozen fish, fruits, and other perishables packed in insulated containers equipped with refrigerator units.

While the present invention has been described in connection with certain now preferred embodiments, it will be clearly understood that many variations and modifications may occur to the skilled in the art, particularly after benefiting from the present teaching without departing from the spirit and scope of this invention as defined in the appended claims.

I claim:

1. A dry cargo ship comprising two side walls, a bottom, two bulkheads extending perpendicularly to said side walls and defining a cargo space with the side walls and the bottom, stringers and gangways permanently attached to said side walls and said bulkheads, respectively, within said cargo space and extending along said side walls and bulkheads, a plurality of pairs of gangways extending inwardly from two opposite ones of said stringers and perpendicularly to said stringers wherefrom they extend, said pairs of gangways having spaced ends, a hatch above the space defined by said spaced ends providing access to the cargo space between said stringers, and a track system supported on said gangways for supporting rigid cargo-supporting bodies placed on the track system, the track system including a plurality of horizontal tracks parallel to one another and supported on said pairs of gangways and those gangways on the bulkheads which are parallel to the pairs of gangways, and each of said tracks supported on said pairs of gangways having a removable center portion extending between the ends of the pair of gangways whereon said first tracks are supported.

2. The dry cargo ship of claim 1, wherein said pairs of gangways extend inwardly from the stringers attached to said side walls whereby said tracks extend transversely of the ship, and further including at least one additional track extending in a direction perpendicular to the first-named tracks and removably supported on the gangways attached to the bulkheads.

3. The dry cargo ship of claim 1, comprising a plurality of superposed levels of said track systems.

4. The dry cargo ship of claim 1, further comprising removable deck planks supported on said stringers and gangways.

References Cited in the file of this patent

UNITED STATES PATENTS

| | | |
|---|---|---|
| D. 185,718 | Patton | July 21, 1959 |
| 929,139 | Kirchner | July 27, 1909 |
| 1,247,553 | Linquist et al. | Nov. 20, 1917 |
| 1,340,438 | Duncan | May 18, 1920 |
| 1,379,773 | Miller | May 31, 1921 |
| 1,900,867 | Olds | Mar. 7, 1933 |
| 1,990,562 | Otis | Feb. 12, 1935 |
| 2,242,635 | Whittelsey | May 20, 1941 |
| 2,287,886 | Kellett | June 30, 1942 |
| 2,319,855 | Forsberg | May 25, 1943 |
| 2,379,231 | Harrison | June 26, 1945 |
| 2,440,306 | Smith | Apr. 27, 1948 |
| 2,513,855 | Fogwell | July 4, 1950 |
| 2,564,966 | Farrel | Aug. 21, 1951 |
| 2,619,066 | Otter | Nov. 25, 1952 |
| 2,621,941 | Neumayr | Dec. 16, 1952 |
| 2,637,453 | Cleveland | May 5, 1953 |

FOREIGN PATENTS

| | | |
|---|---|---|
| 806,098 | Great Britain | Dec. 17, 1958 |
| 807,032 | Great Britain | Jan. 7, 1959 |

OTHER REFERENCES

Cargo Handling Data Sheets, pub. by Work Saving International, copyright 1955, page A–2 relied on.